(12) United States Patent
Kaushik et al.

(10) Patent No.: US 9,332,802 B2
(45) Date of Patent: *May 10, 2016

(54) MOLDED POLYMER ARTICLES FOR USE IN LOW TEMPERATURES HAVING A LOW RIGIDITY FACTOR

(71) Applicant: Ticona LLC, Florence, KY (US)

(72) Inventors: Mukul Kaushik, Florence, KY (US); Dirk Zierer, Hofheim (DE); James L. Coleman, Cincinnati, OH (US); Jeanne Pilis, Cincinnati, OH (US); Kenneth L. Price, Florence, KY (US)

(73) Assignee: Ticona LLC, Florence, KY (US)

( * ) Notice: Subject to any disclaimer, the term of this patent is extended or adjusted under 35 U.S.C. 154(b) by 618 days.

This patent is subject to a terminal disclaimer.

(21) Appl. No.: 13/721,160

(22) Filed: Dec. 20, 2012

(65) Prior Publication Data

US 2013/0167404 A1    Jul. 4, 2013

Related U.S. Application Data

(60) Provisional application No. 61/581,827, filed on Dec. 30, 2011.

(51) Int. Cl.
| | |
|---|---|
| A43B 1/00 | (2006.01) |
| C08L 23/16 | (2006.01) |
| C08L 51/04 | (2006.01) |
| C08L 53/02 | (2006.01) |
| C08L 55/02 | (2006.01) |
| C08L 67/02 | (2006.01) |
| A43B 1/14 | (2006.01) |
| A43B 5/04 | (2006.01) |
| A43C 11/14 | (2006.01) |
| B29D 35/12 | (2010.01) |

(52) U.S. Cl.
CPC ................. *A43B 1/14* (2013.01); *A43B 5/0427* (2013.01); *A43B 5/0482* (2013.01); *A43B 5/0486* (2013.01); *A43C 11/1406* (2013.01); *B29D 35/126* (2013.01); *C08L 67/02* (2013.01)

(58) Field of Classification Search
CPC ......... C08L 53/02; C08L 67/02; C08L 75/04; C08L 2205/08; C08L 2205/18; C08L 2205/035; C08L 2207/068; C08L 23/06; C08L 33/068; C08L 35/02; C08L 47/00; A43B 5/04
USPC ........ 36/87, 115, 117.1, 117.2; 525/123, 176, 525/177

See application file for complete search history.

(56) References Cited

U.S. PATENT DOCUMENTS

| | | | |
|---|---|---|---|
| 3,047,539 A | 7/1962 | Pengilly | |
| 4,180,494 A | 12/1979 | Fromuch et al. | |
| 4,369,280 A | 1/1983 | Dieck et al. | |
| 4,469,851 A | 9/1984 | Charles et al. | |
| 4,548,978 A | 10/1985 | Garrison, Jr. | |
| 4,647,619 A * | 3/1987 | Dean | 525/64 |
| 4,983,660 A | 1/1991 | Yoshida et al. | |
| 5,114,998 A | 5/1992 | Golder et al. | |
| 5,123,183 A | 6/1992 | Paris et al. | |
| 5,219,933 A | 6/1993 | Henton et al. | |
| 5,237,000 A * | 8/1993 | Lausberg et al. | 525/64 |
| 5,283,295 A | 2/1994 | Light et al. | |
| 5,308,894 A | 5/1994 | Laughner | |
| 5,331,044 A | 7/1994 | Lausberg et al. | |
| 5,340,875 A * | 8/1994 | Yang et al. | 525/64 |
| 5,356,991 A * | 10/1994 | Chiolle et al. | 525/66 |
| 5,409,967 A | 4/1995 | Carson et al. | |
| 5,475,046 A | 12/1995 | Son et al. | |
| 5,700,881 A | 12/1997 | Wagner et al. | |
| 5,859,119 A | 1/1999 | Hoefflin | |
| 5,889,102 A | 3/1999 | Haack et al. | |
| 5,941,194 A | 8/1999 | Potente | |
| 5,977,229 A | 11/1999 | Barth et al. | |
| 5,977,299 A | 11/1999 | Annunziato et al. | |
| 6,329,031 B1 | 12/2001 | Kitagawa et al. | |
| 6,616,918 B2 | 9/2003 | Candau | |
| 6,868,624 B1 * | 3/2005 | Trinkaus | 36/117.1 |
| 2002/0088146 A1* | 7/2002 | Joseph et al. | 36/117.3 |
| 2004/0039118 A1 | 2/2004 | Chirgott | |
| 2006/0293416 A1 | 12/2006 | Peters et al. | |
| 2008/0103257 A1 | 5/2008 | Tokuyama et al. | |
| 2008/0132641 A1* | 6/2008 | Li et al. | 525/67 |
| 2009/0181199 A1 | 7/2009 | Agarwal et al. | |
| 2009/0223955 A1 | 9/2009 | Maziers | |
| 2011/0034612 A1 | 2/2011 | Lyons et al. | |
| 2011/0180300 A1 | 7/2011 | Gu et al. | |
| 2012/0202940 A1* | 8/2012 | Hausmann et al. | 524/514 |

FOREIGN PATENT DOCUMENTS

| | | |
|---|---|---|
| CH | 655941 A5 | 5/1986 |
| EP | 0152049 A2 | 8/1985 |

(Continued)

OTHER PUBLICATIONS

Paraloid EXL-2691 data sheet Jun. 2002.*

(Continued)

*Primary Examiner* — Randy Gulakowski
*Assistant Examiner* — Christopher M Rodd
(74) *Attorney, Agent, or Firm* — Dority & Manning, P.A.

(57) ABSTRACT

Ski boots and other cold weather articles are described made from polymer compositions that are exceptionally stable at low temperatures. The polymer composition, for instance, may contain a thermoplastic polymer, a thermoplastic elastomer, and an impact modifier. In one embodiment, each of the individual components are selected such that they do not undergo a second order transition within a temperature range of from about 50° C. to about −40° C., and particularly from about 23° C. to about −40° C. In one embodiment, the polymer compositions are used to mold the outer shell of a snow ski boot.

23 Claims, 2 Drawing Sheets

(56) References Cited

FOREIGN PATENT DOCUMENTS

| EP | 0237306 A2 | 9/1987 |
|----|------------|--------|
| EP | 0279808 A2 | 8/1988 |
| EP | 0443457 | 8/1991 |
| WO | 86/04913 | 8/1986 |
| WO | WO 9617019 | 6/1996 |

OTHER PUBLICATIONS

Lee, Thermoplastic Polyurethane Markets in the EU, pag 49, Jan. 1, 1998.*
Volegova, Glass Transition of Undrawn and Drawn Copolyetherester Thermoplastic Elastomers, International Journal of Polymeric Materials, 52, 549-564, Jun. 2003.*
Kaushik, et al., U.S. Appl. No. 13/945,444, filed Jul. 18, 2013, Wear Resistant Thermoplastic Copolyester Elastomer.
Kaushik, et al., U.S. Appl. No. 13/801,394, filed Mar. 13, 2013, Polymer Composition and Articles for use in Low Temperature Environments that are Wear Resistant.
Citation of Related Applications Form.
International Search Report for Appl. No. PCT/US2013/030839, dated May 22, 2013.
International Search Report for Appl. No. PCT/US2012/070793, May 27, 2003.
XP002696765; Thomson Scientific, London, GB, Nov. 28, 1995.

* cited by examiner

MOLDED POLYMER ARTICLES FOR USE IN LOW TEMPERATURES HAVING A LOW RIGIDITY FACTOR

RELATED APPLICATIONS

The present application claims priority to U.S. Provisional Application No. 61/581,827 filed Dec. 30, 2011, which is hereby incorporated by reference in its entirety.

BACKGROUND

Many polymer articles are designed for use in cold weather applications. Such polymer articles include machine parts, housings and covers, sports equipment and the like. For example, high performance snow ski boots are made from polymer compositions that are intended to have good impact resistance properties at colder temperatures so that the boots will not crack or otherwise fail during use.

In the past, various problems have arisen in designing high performance snow ski boots. For instance, problems have arisen in attempting to formulate polymer compositions having excellent impact resistance properties at lower temperatures without compromising other properties of the material. Consequently, further improvements are needed in formulating compositions used for producing cold weather sports equipment, such as ski boots. Increasing the impact resistance properties of the polymer composition especially at lower temperatures will allow designers of ski boots to make the walls of the ski boot thinner, thereby not only reducing the weight of the product but also increasing the performance.

Another problem that has been faced by ski boot manufacturers is the ability to produce polymer compositions whose physical properties remain constant over a wide temperature range. For example, since thermoplastic polymers exhibit temperature-dependent behavior, ski boots have a tendency to vary in stiffness, in feel, and in performance as the temperature of the environment changes. For example, the same ski boot may perform differently at a temperature of 0° C. in comparison to at a temperature at −10° C. These differences are very noticeable to a high level skier. In fact, many snow skiers who compete at high levels are known to bury their ski boots in the snow when air temperatures increase in order to increase stiffness and obtain consistent performance out of the ski boot. Small property changes in the ski boot can have a significant impact on a ski competitor's performance, especially when many contests are decided by a fraction of a second.

In view of the above, a need currently exists for an improved polymer composition for use in cold weather environments. In particular, a need exists for molded articles made from a polymer composition that not only has excellent impact resistance properties but also displays stable modulus properties over a broad temperature range.

SUMMARY

In general, the present disclosure is directed to molded articles made from polymer compositions that are well suited for use in low temperature environments. The polymer composition of the present disclosure is made from a combination of polymers that results in molded articles having very stable physical properties at temperatures less than about 40° C., such as at temperatures less than about 23° C., such as at temperatures from about 23° C. to about −40° C. In particular, the polymer components used to formulate the composition each can be selected such that none of the components undergo a second order transition within a temperature range of from about 40° C. to about −40° C.

Various different articles can be made in accordance with the present disclosure. The articles may comprise industrial parts that are used in low temperature environments. In other embodiments, molded articles made according to the present disclosure may include high performance sports equipment for use in winter activities, such as skating and skiing. In one particular embodiment, for instance, the present disclosure is directed to a snow ski boot that includes an outer shell molded from a polymer composition made in accordance with the present disclosure.

In one embodiment, for instance, the present disclosure is directed to a boot comprising a rigid outer shell and a lining placed adjacent to an interior surface of the outer shell. The outer shell and the lining define an opening for receiving the foot of a wearer. In accordance with the present disclosure, the rigid outer shell is formed from a molded polymer composition. The polymer composition comprises a thermoplastic polymer, a thermoplastic elastomer, and an impact modifier. In accordance with the present disclosure, the polymer composition displays a rigidity factor of about 2 or less, such as about 1.5 or less, such as even about 1.2 or less. The rigidity factor is calculated by dividing the flexural modulus of the polymer composition at −20° C. by the flexural modulus of the composition at 23° C. Having a low rigidity factor indicates that the polymer composition is stable over a wide range of lower temperatures.

In one embodiment, the thermoplastic polymer contained in the polymer composition comprises a non-elastomeric polymer, such as a polyester polymer. For instance, the thermoplastic polymer may comprise polybutylene terephthalate, polyethylene terephthalate, or mixtures thereof. In an alternative embodiment, the thermoplastic polymer may comprise a polycarbonate alone or in combination with a polyester polymer.

The thermoplastic elastomer contained in the polymer composition may also comprise a polyester polymer, such as a polyester copolymer.

The impact modifier, in one embodiment, has a core and shell construction. The core can comprise a crosslinked diene-based elastomer while the shell may comprise a thermoplastic polymer such as a methacrylate polymer. In one embodiment, the impact modifier has a methylmethacrylate-butadiene-styrene construction.

In one particular embodiment, the polymer composition comprises a non-elastomeric polyester polymer present in an amount from about 15% to about 50% by weight, an impact modifier as described above being present in an amount from about 15% to about 40% by weight, and a thermoplastic elastomer being present in an amount from about 20% to about 40% by weight. In addition to the above components, an additional non-elastomeric thermoplastic polymer may be added to the composition in order to improve printability. The additional polymer may comprise a polycarbonate polymer, a non-elastic copolyester, or an amorphous polyester. Such polyesters include glycol-modified polyethylene terephthalate (PETG), an isophthalic acid-modified polyethylene terephthalate (PETA), a glycol-modified poly(1,4-cyclohexanedimethanol terephthalate) (PCTG), or isophthalic acid-modified poly(1,4-cyclohexandimethanol terephthalate) (PCTA). A polycarbonate polymer or a polyester polymer may be selected that does not undergo a second order transition within a temperature range of from 40° C. to about −40° C. One or more of the above additional thermoplastic polymers may be present in the composition in an amount from about 5% to about 15% by weight in order to improve printability.

The boot may comprise a snow ski boot and may include a sole defining at least one flange for attachment to ski bindings. In one embodiment, the outer shell of the boot includes a boot portion and a separate cuff portion.

In addition to snow ski boots, however, it should be understood that various other molded articles may be made in accordance with the present disclosure. For instance, the boot may also be part of ice skates, including hockey skates.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
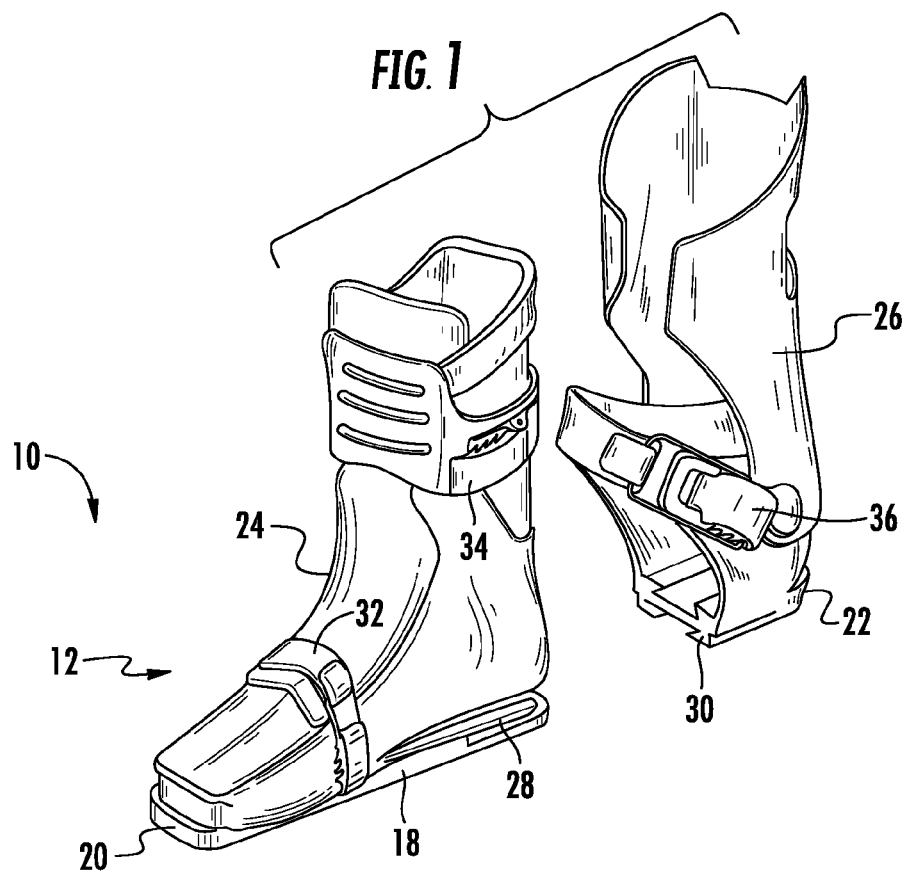
FIG. 1 is a perspective view of one embodiment of a snow ski boot made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to molded polymer articles that are well suited for use in low temperature environments. More particularly, the molded articles of the present disclosure are well suited for use at temperatures below 0° C. in high performance applications. In one embodiment, for instance, the molded article may comprise the outer shell of a snow boot, and particularly a snow ski boot. As will be described in greater detail below, polymer compositions formulated in accordance with the present disclosure have very stable properties over a relatively large temperature range that includes temperatures below freezing.

In general, the polymer composition of the present disclosure comprises a thermoplastic polymer that may be characterized as non-elastomeric and is provided in the composition for providing rigidity and stability. The thermoplastic polymer is combined with a thermoplastic elastomer and an impact modifier. The impact modifier may comprise, in one embodiment, a butadiene-type core-shell modifier. The impact modifier, for instance, may have an elastomeric core and a thermoplastic shell. As will be described in greater detail below, the above components are combined together in a manner that produces a polymer composition having a rigidity factor of 2 or less, such as 1.5 or less, such as 1.3 or less.

The rigidity factor of a polymer composition is calculated by dividing the flexural modulus of the polymer composition at −20° C. by the flexural modulus of the composition at 23° C. As used herein, the flexural modulus is determined according to ISO Test 178. The rigidity factor is an indication of the temperature dependent behavior of the polymer composition at lower temperatures. A rigidity factor of less than 2 is an indication that the polymer composition is stable at lower temperatures over a wide temperature range and does not significantly change in stiffness or performance.

In order to produce a polymer composition having a rigidity factor of about 2 or less, the different components contained in the polymer composition of the present disclosure are selected based upon their individual properties. In particular, in one embodiment, the thermoplastic polymer, the thermoplastic elastomer, and the impact modifier are selected such that none of the above polymers undergo a glass transition or undergo any other second order transition at a temperature range of from about 50° C. to about −40° C., and particularly from about 37° C. to about −30° C.

In addition to the above, the particular polymer components contained in the polymer composition may also be selected such that they are not hygroscopic. For instance, in one embodiment, the non-elastomeric thermoplastic polymer contained in the composition is not hygroscopic such that the thermoplastic polymer absorbs less than 0.5% by weight moisture at equilibrium, and particularly less than about 0.4% by weight moisture at equilibrium. In this regard, thermoplastic polymers well suited for use in the present disclosure include polymers that do not undergo second order transitions at lower temperatures and that do not possess significant amounts of hydrogen bonding that can increase moisture absorption.

In one embodiment, the thermoplastic polymer contained in the polymer composition in accordance with the present disclosure comprises an aromatic polymer which, as used herein, refers to a polymer having aromatic rings in its molecular structure. For example, in one embodiment, the aromatic polymer may comprise a polyester polymer. In another embodiment, the thermoplastic polymer may comprise a polycarbonate polymer. In still another embodiment, a polyester polymer may be combined with a polycarbonate polymer or a copolyester polymer The thermoplastic elastomer present in the polymer composition may also comprise an aromatic polymer. For instance, in one embodiment, the thermoplastic elastomer may comprise a polyester copolymer. The impact modifier, as described above, may comprise a core-shell modifier that contains an elastomeric core surrounded by a thermoplastic polymer, such as an acrylate polymer.

The polymer composition can be molded into any suitable shape. For instance, the polymer composition can be used in an injection molding process. Polymer articles made in accordance with the present disclosure are particularly well suited for use in low temperature environments, such as in environments where the temperature range is from 23° C. to about −40° C., and particularly from about 0° C. to about −20° C. Within the above range, the physical properties of the polymer composition remain extremely stable. For instance, the stiffness of the polymer does not appreciably change over the above temperature range, which is indicated by the rigidity factor described above.

Polymer articles that can be made in accordance with the present disclosure include sporting equipment that is used in low temperature environments, such as sporting equipment used in winter sports activities. In addition, the polymer composition may be used to produce industrial equipment that is intended to withstand colder outside temperatures or may be designed to be used in refrigerated processes. The polymer composition may also be used to produce molded snow removal equipment, such as snow shovels and the like.

In one embodiment, the polymer composition is used to produce molded boots, and particularly boots for use in cold weather applications. For instance, the boots may be incorporated into ice skates including hockey skates.

Figure 2:
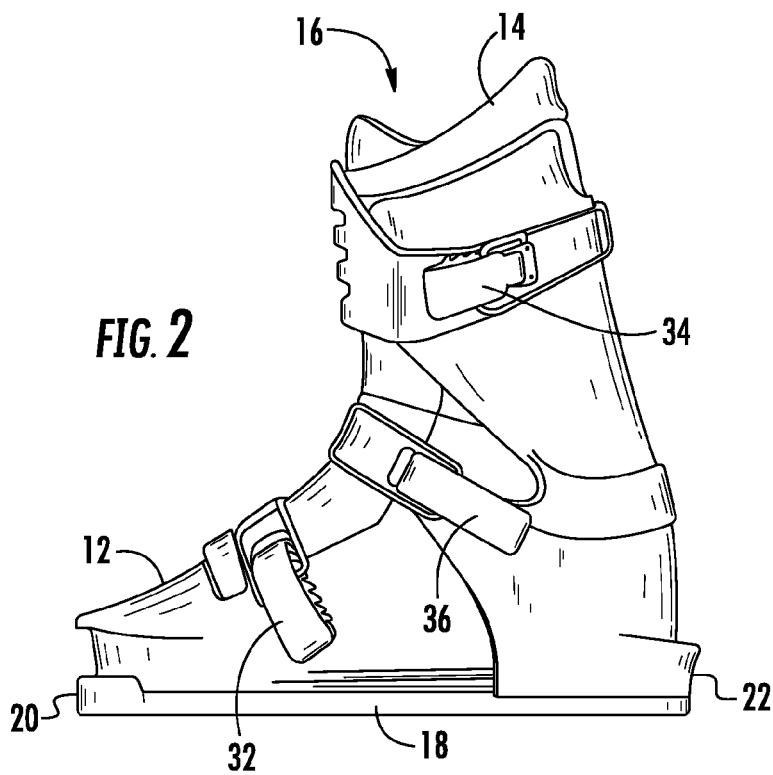
FIG. 2 is a side view of the snow ski boot illustrated in FIG. 1.

In one particular embodiment, as shown in the figures, the polymer composition may be used to produce snow skiing boots. Referring to FIGS. 1 and 2, for instance, one embodiment of a ski boot 10 made in accordance with the present disclosure is shown. The ski boot 10 includes a rigid outer shell 12 made from a polymer composition in accordance with the present disclosure. The outer shell 12 includes an exterior surface and an interior surface. The interior surface may be placed adjacent to a lining 14. The lining 14 may be permanently attached to the outer shell 12 or may be removable from the outer shell. The outer shell 12 and the lining 14 of the ski boot 10 defines an opening 16 for receiving the foot of a wearer.

As shown in FIGS. 1 and 2, the outer shell 12 forms a sole 18. The sole 18 has a shape configured to engage the bindings of a ski. In particular, the sole 18 includes a front flange 20 and a back flange 22. The flanges 20 and 22 can have any suitable shape such that they will cooperate with bindings on a ski and releasably detach from the skis should the skier fall during use.

In the embodiment illustrated in FIGS. 1 and 2, the outer shell 12 of the ski boot 10 is made from two separate pieces. In particular, the outer shell 12 includes a boot portion 24 and a cuff portion 26. The boot portion 24 and the cuff portion 26 can be made from the same polymer composition. In an alternative embodiment, however, different polymer compositions may be used that have different but complementary properties, such as flexural modulus properties.

As shown in FIG. 1, the boot portion 24 of the ski boot 10 includes grooves 28 that cooperate with ribs 30 on the cuff portion 26 for interlocking the two pieces of the boot together. If desired, the cuff portion 26 can be permanently attached to the boot portion 24 through screws or other attachment devices that may extend from the bottom of the boot and through the two portions.

In the embodiment illustrated in FIGS. 1 and 2, the ski boot 10 includes three buckles. The first buckle 32 is positioned on the toe portion of the ski boot. The second buckle 34, on the other hand, is positioned higher on the ski boot and is intended to secure the ski boot to the lower leg of a wearer. The cuff portion 26 further includes a third buckle 36 that wraps around the ankle of the wearer. The third buckle 36 also further serves to integrate the cuff portion 26 with the boot portion 24.

In accordance with the present disclosure, the outer shell 12 of the ski boot 10 is made from a polymer composition that has stable physical properties at lower temperatures and particularly possesses a rigidity factor of about 2 or less. In one embodiment, the outer shell of the ski boot 10 may be made from the polymer composition and may have a resulting flexural modulus of from about 300 MPa to about 600 MPa, such as from about 400 MPa to about 500 MPa.

Figure 3:
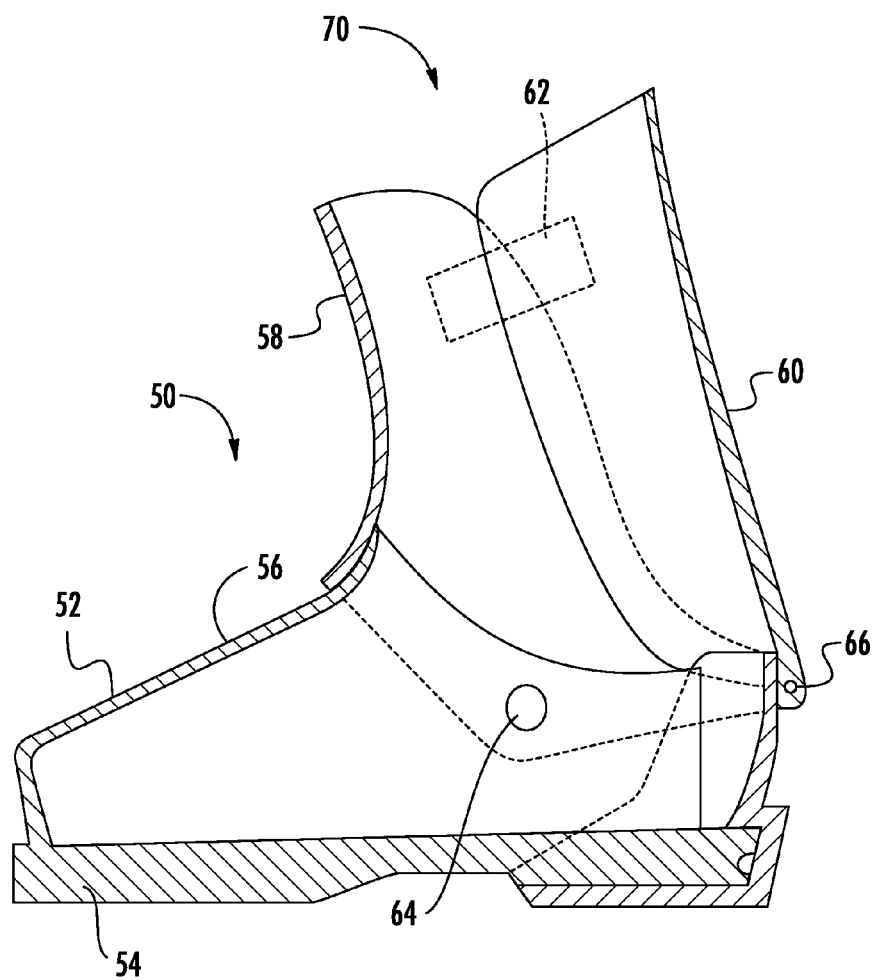
FIG. 3 is a cross-sectional view of another embodiment of a snow ski boot made in accordance with the present disclosure.

Referring to FIG. 3, another embodiment of a ski boot 10 made in accordance with the present disclosure is shown. In this embodiment, a cross-sectional view of the boot is illustrated. The ski boot 50 shown in FIG. 3 is referred to in the art as a "rear entry" ski boot in that the boot includes a rear portion that pivots for allowing one to insert his or her foot.

As shown in FIG. 3, the ski boot 10 includes a rigid outer shell 52 made in accordance with the present disclosure. Not shown, the ski boot 50 may also include a lining that lines the hollow interior cavity of the outer shell 52. The outer shell 52 also defines a sole 54 that has a shape configured to engage the bindings of a ski.

In the embodiment illustrated in FIG. 3, the outer shell 52 of the ski boot 50 is made from multiple parts. The outer shell 52 includes a boot portion 56 attached to a front cuff 58 and to a rear cuff 60. The front cuff 58 and the rear cuff 60 are tightened around a skier's lower leg during use. For instance, in one embodiment, the ski boot 50 may include a buckle 62 for adjustably tightening the front cuff 58 together with the back cuff 60.

The front cuff 58 is pivotally attached to the boot portion 56 about a pivot element 64. The rear cuff 60, on the other hand, may be attached to the boot portion 56 by a pivot element 66. In this manner, the rear cuff 60 can be pivoted backwards to expose an opening 70 for receiving the foot of a wearer.

In the embodiment illustrated in FIG. 3, each of the different sections of the ski boot may be attached to a different liner for providing cushion and comfort to the wearer. Alternatively, a one-piece liner may be inserted into the boot for surrounding the foot and ankle of a wearer.

Similar to the embodiment illustrated in FIGS. 1 and 2, the outer shell 52 of the ski boot 50 is also made with a polymer composition in accordance with the present disclosure. As described above, the polymer composition generally contains a non-elastomeric thermoplastic polymer in combination with a thermoplastic elastomer and an impact modifier.

In one embodiment, the non-elastomeric thermoplastic polymer comprises a non-hygroscopic polymer that does not undergo a second order transition between a temperature range of from about 50° C. to about −40° C. In one embodiment, the thermoplastic polymer comprises a polyester polymer, and particularly an aromatic polyester polymer.

The polyesters which are suitable for use herein are derived from an aliphatic or cycloaliphatic diol, or mixtures thereof, containing from 2 to about 10 carbon atoms and an aromatic dicarboxylic acid, i.e., polyalkylene terephthalates.

Also contemplated herein are the above polyesters with minor amounts of units derived from aliphatic dicarboxylic acids, e.g., of up to about 50 carbon atoms, including cycloaliphatic straight and branched chain acids, such as adipic acid, cyclohexanediacetic acid, dimerized $C_{16}$-$C_{18}$ unsaturated acids (which have 32 to 36 carbon atoms), trimerized acids, and the like.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid.

Examples of aromatic dicarboxylic acids include isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present such as in 1,4- or 1,5-naphthalenedicarboxylic acids. In one embodiment, the dicarboxylic acid is terephthalic acid or mixtures of terephthalic and isophthalic acid.

Polyesters that may be used in the polymer composition, for instance, include polyethylene terephthalate, polybutylene terephthalate, and mixtures thereof (which also includes copolymers of the above polymers). The polyester polymer, for instance, may have an intrinsic viscosity (IV) of from about 0.55 to about 0.88.

In one embodiment of the present disclosure, the thermoplastic polymer comprises polybutylene terephthalate. The polybutylene terephthalate can be formed by polymerizing a glycol component containing from about 70 mol percent to about 80 mol percent tetramethylene glycol and an acid component comprising terephthalic acid or a derivative ester thereof, such as dimethylterephthalate. The terephthalic acid or derivative ester thereof may comprise at least about 70 mol percent, such as at least about 80 mol percent of the acid component. If desired, minor amounts of other ester components may be used to produce the polyester polymer. For instance, from about 0.5% to about 5% by weight of units derived from aliphatic or other aromatic dicarboxylic acids and/or aliphatic polyols, e.g., glycols, i.e., copolyesters may be present. Among the units which can be present in the copolyesters are those derived from aliphatic dicarboxylic acids which have up to about 50 carbon atoms in the carbon chain and which include straight and branched chain acids, such as adipic acid, dimerized $C_{16}$ to $C_{18}$ unsaturated acids, trimerized such acids, and the like. Minor amounts of other aromatic dicarboxylic acids may be present such as isophthalic acids.

In an alternative embodiment, the thermoplastic polymer contained in the polymer composition may comprise a polycarbonate polymer. In one embodiment, the thermoplastic polymer may comprise a mixture of a polybutylene terephthalate polymer and a polycarbonate polymer. The polycarbonate polymer may slightly adjust the physical properties of the polyester polymer in a desirable way and/or may improve the ability of the molded article to receive printed matter. Some polycarbonate polymers, however, may be hygroscopic in nature and therefore may not perform as well as some polyester polymers, particularly polybutylene terephthalate.

In one embodiment, an aromatic polycarbonate polymer may be used. Polycarbonates suitable for use can be prepared from dihydroxy compounds according to the structures of the following Formula I or Formula II:

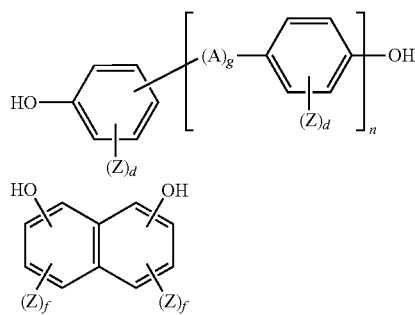

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, an aromatic group with 6 to 15 carbon atoms, a carbonyl group, an oxygen atom, a sulfur atom, an —SO— or —SO.sub.2-radical or a radical of the general Formula III:

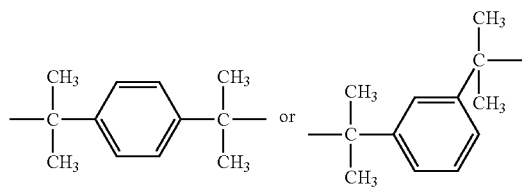

g denotes the number 0 or 1; e denotes the number 0 or 1; Z denotes (in addition to any aromatic H atoms) F, Cl or Br atoms or a $C_{1-3}$ alkyl and if several Z radicals are substituents in one aryl radical, they may be identical or different; d denotes 0 or an integer of from 1 to 4; and f denotes 0 or an integer of from 1 to 3.

Dihydroxy compounds include hydroquinone, resorcinol, bis-(hydroxyphenyl)alkanes, bis-(hydroxyphenyl)cycloalkanes, bis-(hydroxyphenyl)ethers, bis-(hydroxyphenyl)ketones, bis-(hydroxyphenyl)sulfoxides, bis-(hydroxyphenyl) sulfones and α,α-bis-(hydroxyphenyl)diisopropylbenzenes. Further specific examples of suitable dihydroxy compounds are the bisphenols including 2,2-bis-(4-hydroxyphenyl)propane (bisphenol A), 2,4-bis-(4-hydroxyphenyl)-2-methylbutane, 1,1-bis-(4-hydroxyphenyl)cyclohexane, α,α-bis-(4-hydroxyphenyl-p-diisopropylbenzene, 2,2-bis-(3-chloro-4-hydroxyphenyl)propane, 2,2-bis-(3,5-dichloro-4-hydroxyphenyl)propane, 2,2-bis-(3,5-dibromo-4-hydroxyphenyl)propane and 1,1-bis-(4-hydroxyphenyl)-1-phenylethane hydroxybenzophenone and 4,4-sulfonyl diphenol.

The preparation of polycarbonate resins may be carried out in accordance with any of the processes known in the art, for example, by the interfacial polycondensation process, polycondensation in a homogeneous phase or by transesterification.

In the preparation of the polycarbonate resins, monofunctional reactants such as monophenols may be used. Also, branching may be obtained by the incorporation, in the respective processes, of small amounts of between about 0.05 and 2.0 molecular percent (relative to the dihydroxy compound employed) of branching agents which are at least trifunctional compounds, especially, compounds having three or more phenolic hydroxyl groups.

Some examples of compounds with at least three or more phenolic hydroxyl groups which can be used are phloroglucinol; 4,6-dimethyl-2,4,6-tri-(4-hydroxyphenyl)heptane; 2,4,6-trimethyl-2,4,6-tri-(4-hydroxyphenyl)heptane; 1,4,5-tri-(4-hydroxyphenyl)benzene; 1,1,1-tri-(4-hydroxyphenyl) ethane; tri-(4-hydroxyphenyl)phenylmethane; 2,2-bis-(4,4-bis-(4-hydroxyphenyl)cyclohexyl)propane; 2,4-bis-(4-hydroxyphenylisopropyl)phenol; 3,6-bis-(2-hydroxy-5'-methylbenzyl)-4-methylphenol; 2-(4-hydroxyphenyl)-2-(2, 4-dihydroxyphenyl)propane; hexa(4-(4-hydroxyphenylhexa (4-(4-hydroxyphenylisopropyl)phenyl)ortho-terephthalic acid ester; tetra-(4-hydroxyphenyl)methane; tetra-(4-(4-hydroxyphenylisopropyl)phenoxy)methane and 1,4-bis-(4',4"-dihydroxytriphenyl)methyl)benzene. Some of the other trifunctional compounds are 2,4-dihydroxybenzoic acid; trimellitic acid; trimesic acid; cyanuric chloride and 3,3-bis-(4-hydroxyphenyl)-2-oxo-2,3-dihydroindole.

The thermoplastic polymer is present in the polymer composition in an amount sufficient to produce a continuous phase within the molded article. For example, the thermoplastic polymer may be present in the polymer composition in an amount of at least about 15% by weight, such as in an amount of at least about 20% by weight, such as in an amount of at least about 25% by weight. The thermoplastic polymer is generally present in an amount less than about 70% by weight, such as in an amount less than about 60% by weight. In one embodiment, for instance, the thermoplastic polymer is present in the polymer composition in an amount from about 15% by weight to an amount of about 60% by weight, such as in an amount from about 25% by weight to an amount of about 55% by weight. The above amounts may refer to a single thermoplastic polymer or to a mixture of thermoplastic polymers.

In one embodiment, two thermoplastic polymers may be combined together that have a different flexural modulus to result in an overall flexural modulus within desired limits.

In one particular embodiment, the thermoplastic polymer may comprise a polybutylene terephthalate polymer. In this embodiment, the polybutylene terephthalate polymer may be present in the polymer composition in an amount from about 15% by weight to about 45% by weight, such as in an amount from about 15% by weight to about 35% by weight to produce a polymer composition having a flexural modulus of from about 200 MPa to about 450 MPa.

In an alternative embodiment, a polybutylene terephthalate may be used that has a higher flexural modulus. In this embodiment, the polybutylene terephthalate polymer may be present in the polymer composition in an amount from about 30% by weight to about 60% by weight, and particularly from about 30% by weight to about 50% by weight to produce a polymer composition having a flexural modulus of from about 600 MPa to about 1000 MPa.

In accordance with the present disclosure, the one or more thermoplastic polymers are combined with a thermoplastic elastomer and an impact modifier. In one embodiment, the thermoplastic elastomer also comprises a polyester polymer. More particularly, the thermoplastic elastomer may comprise a copolyester elastomer, such as a segmented thermoplastic copolyester.

Useful segmented thermoplastic copolyester elastomers include a multiplicity of recurring long chain ester units and short chain ester units joined head to tail through ester linkages. The long chain units can be represented by the formula

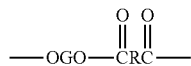

and the short chain units can be represented by the formula

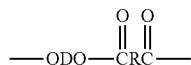

where G is a divalent radical remaining after the removal of the terminal hydroxyl groups from a long chain polymeric glycol having a number average molecular weight in the range from about 600 to 6,000 and a melting point below about 55° C., R is a hydrocarbon radical remaining after removal of the carboxyl groups from dicarboxylic acid having a molecular weight less than about 300, and D is a divalent radical remaining after removal of hydroxyl groups from low molecular weight diols having a molecular weight less than about 250.

The short chain ester units in the copolyetherester provide about 25 to 95% of the weight of the copolyetherester, and about 50 to 100% of the short chain ester units in the copolyetherester are identical.

The term "long chain ester units" refers to the reaction product of a long chain glycol with a dicarboxylic acid. The long chain glycols are polymeric glycols having terminal (or nearly terminal as possible) hydroxy groups, a molecular weight above about 600, such as from about 600-6000, a melting point less than about 55° C. and a carbon to oxygen ratio about 2.0 or greater. The long chain glycols are generally poly(alkylene oxide) glycols or glycol esters of poly(alkylene oxide) dicarboxylic acids. Any substituent groups can be present which do not interfere with polymerization of the compound with glycol(s) or dicarboxylic acid(s), as the case may be. The hydroxy functional groups of the long chain glycols which react to form the copolyesters can be terminal groups to the extent possible. The terminal hydroxy groups can be placed on end capping glycol units different from the chain, i.e., ethylene oxide end groups on poly(propylene oxide glycol).

The term "short chain ester units" refers to low molecular weight compounds or polymer chain units having molecular weights less than about 550. They are made by reacting a low molecular weight diol (below about 250) with a dicarboxylic acid.

The dicarboxylic acids may include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The dicarboxylic acid monomers for the elastomer have a molecular weight less than about 300. They can be aromatic, aliphatic or cycloaliphatic. The dicarboxylic acids can contain any substituent groups or combination thereof which do not interfere with the polymerization reaction. Representative dicarboxylic acids include terephthalic and isophthalic acids, bibenzoic acid, substituted dicarboxy compounds with benzene nuclei such as bis(p-carboxyphenyl) methane, p-oxy-(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralenedicarboxylic acid, anthralenedicarboxylic acid, 4,4'-sulfonyl dibenzoic acid, etc. and $C_1$-$C_{10}$ alkyl and other ring substitution derivatives thereof such as halo, alkoxy or aryl derivatives. Hydroxy acids such as p(β-hydroxyethoxy) benzoic acid can also be used providing an aromatic dicarboxylic acid is also present.

Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexane-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylenedicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate. The preferred aliphatic acids, are the cyclohexanedicarboxylic acids and adipic acid.

The dicarboxylic acid may have a molecular weight less than about 300. In one embodiment, phenylene dicarboxylic acids are used such as terephthalic and isophthalic acid.

Included among the low molecular weight (less than about 250) diols which react to form short chain ester units of the copolyesters are acyclic, alicyclic and aromatic dihydroxy compounds. Included are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Also included are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). Low molecular weight diols also include such equivalent ester-forming derivatives.

Long chain glycols which can be used in preparing the polymers include the poly(alkylene oxide) glycols such as polyethylene glycol, poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random and block copolymers of ethylene oxide and 1,2-propylene oxide and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide HOOCCH$_2$(OCH$_2$CH$_2$CH$_2$CH$_2$)$_x$OCH$_2$COOH IV can be used to form long chain glycols in situ. Polythioether glycols and polyester glycols also provide useful products. In using polyester glycols, care must generally be exercised to control a tendency to interchange during melt polymerization, but certain sterically hindered polyesters, e.g., poly(2,2-dimethyl-1,3-propylene adipate), poly(2,2-dimethyl-1,3-propylene/2-methyl-2-ethyl-1,3-propylene 2,5-dimethylterephthalate), poly(2,2-dimethyl-1,3-propylene/2,2-diethyl-1,3-propylene, 1,4 cyclohexanedicarboxylate) and poly(1,2-cyclohexylenedimethylene/2,2-dimethyl-1,3-propylene 1,4-cyclohexanedicarboxylate) can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylenediene copolymers are useful raw materials.

Although the long chain dicarboxylic acids (IV) above can be added to the polymerization reaction mixture as acids, they react with the low molecular weight diols(s) present, these always being in excess, to form the corresponding poly(alkylene oxide) ester glycols which then polymerize to form the G units in the polymer chain, these particular G units having the structure

-DOCCH$_2$(OCH$_2$CH$_2$CH$_2$CH$_2$)$_x$OCH$_2$COOD0 when only one low molecular weight diol (corresponding to D) is employed. When more than one diol us used, there can be a different diol cap at each end of the polymer chain units. Such dicarboxylic acids may also react with long chain glycols if they are present, in which case a material is obtained having a formula the same as V above except the Ds are replaced with polymeric residues of the long chain glycols. The extent to which this reaction occurs is quite small, however, since the low molecular weight dial is present in considerable molar excess.

In place of a single low molecular weight dial, a mixture of such diols can be used. In place of a single long chain glycol or equivalent, a mixture of such compounds can be utilized, and in place of a single low molecular weight dicarboxylic acid or its equivalent, a mixture of two or more can be used in preparing the thermoplastic copolyester elastomers which can be employed in the compositions of this invention. Thus, the letter "G" in Formula II above can represent the residue of a single long chain glycol or the residue of several different glycols, the letter D in Formula III can represent the residue of one or several low molecular weight diols and the letter R in Formulas II and III can represent the residue of one or several dicarboxylic acids. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters. The copolyester elastomer can be made by conventional ester interchange reaction.

In general, a thermoplastic elastomer is selected that does not undergo a second order transition throughout a temperature range of from about 23° C. to about −40° C. The thermoplastic elastomer may be present in the composition in an amount from about 20% to about 40% by weight.

Impact modifiers present in the polymer composition generally contain a diene-based elastomer. In one embodiment, for instance, the impact modifier may comprise a core-shell modifier that includes an elastomeric core surrounded by a thermoplastic shell. The core, for instance, may comprise a crosslinked diene-based elastomer. The particle size of the impact modifier may generally range from about 0.002 microns to about 50 microns. The impact modifier increases impact strength while also reducing the temperature dependency of the flexural modulus.

The impact modifiers may contain both a rubbery component and a grafted rigid phase component. The impact modifiers may be prepared by grafting a (meth)acrylate and/or a vinyl aromatic polymer, including copolymers thereof such as styrene/acrylonitrile, onto the selected rubber. In one embodiment, the graft polymer is a homo- or copolymer of methylmethacrylate.

The rubber or elastomeric material can be, for example, one or more of the butadiene-, butyl acrylate-, or EPDM-types. The impact modifier can contain at least about 40 weight percent of the rubber material, such as at least about 45 and, in one embodiment, at least about 60 weight percent of the rubber material. The impact modifier can contain up to 100 weight percent elastomer (no rigid phase) and may contain less than 95 weight percent of the elastomer, such as less than 90 weight percent of the elastomer with the balance being a rigid phase polymer of which at least a portion is graft polymerized and/or crosslinked around or to the elastomer.

In one embodiment, the impact modifier contains as an elastomer a substrate polymer latex or core which is made by polymerizing a conjugated diene, or by copolymerizing a conjugated diene with a mono-olefin or polar vinyl compound, such as styrene, acrylonitrile or methyl methacrylate. The substrate rubber is typically made up of about 45 to 100 percent conjugated diene and up to about 55 percent of the mono-olefin or polar vinyl compound. A mixture of monomers is then graft polymerized to the substrate latex. A variety of monomers may be used for this grafting purpose, including vinyl aromatic compounds such as styrene, vinyl toluene, alpha-methyl styrene, halogenated styrene, naphthalene; acrylonitriles including methacrylonitrile or alpha-halogenated acrylonitrile; or a $C_1$-$C_8$ alkyl (meth)acrylate such as methyl acrylate, ethylacrylate, hexyl acrylate, methyl methacrylate, ethyl methacrylate or hexyl methacrylate; an acrylic or methacrylic acid; or a mixture of two or more of the foregoing. The extent of grafting is sensitive to the substrate latex particle size and grafting reaction conditions, and particle size may be influenced by controlled coagulation techniques among other methods. The rigid phase may be crosslinked during the polymerization by incorporation of various polyvinyl monomers such as divinyl benzene and the like.

The grafting monomers may be added to the reaction mixture simultaneously or in sequence, and, when added in sequence, layers, shells or wart-like appendages can be built up around the substrate latex, or core. The monomers can be added in various ratios to each other. A typical weight ratio for a methacrylate-butadiene-styrene (MBS) elastomer is about 60 to 80 parts by weight substrate butadiene polymer rubber latex, about 40 to 20 parts by weight grafted methyl methacrylate polymer.

In one embodiment, the impact modifier comprises an MBS material that includes a graft copolymer formed between a butadiene polymer core and at least one vinyl monomer such as a derivative of acrylic or methacrylic acid. The butadiene may account for from about 50 mol percent to about 75 mol percent of the total polymer. In one embodiment, more than one vinyl monomer is grafted to the butadiene elastomer. For instance, in one embodiment, a three-stage polymer is used having a butadiene-based core, a second-stage polymerized from styrene and a final stage or shell polymerized from methylmethacrylate and 1,3-butylene glycol dimethacrylate. In one embodiment, the M:B:S ratio can be about 15:70:15.

In general, the impact modifier is present in the polymer composition in an amount of at least about 15% by weight, such as in an amount of at least about 18% by weight. In general, the impact modifier is present in an amount less than about 40% by weight, such as in an amount less than about 35% by weight. In one particular embodiment, the impact modifier is present in an amount from about 18% by weight to about 30% by weight.

Block copolymers of butadiene and vinyl aromatic hydrocarbons may also be utilized as the impact modifier and include any of those which exhibit elastomeric properties. Such block copolymers may be multiblock copolymers of varying structures containing various ratios of butadiene to vinyl aromatic hydrocarbons including those containing up to about 60 percent by weight of vinyl aromatic hydrocarbon. Thus, multiblock copolymers may be utilized which are linear or radial symmetric or asymmetric and which have structures represented by the formulae A-B, A-B-A, A-B-A-B, B-A-B, $(AB)_{1,2,3}$ ... BA and the like wherein A is a polymer block of vinyl aromatic hydrocarbon or a conjugated diene/vinyl aromatic hydrocarbon tapered copolymer block and B is a polymer block of butadiene.

The butadiene block includes 1,3-butadiene, 2-methyl-1, 3-butadiene (isoprene), 2,3-dimethyl, -1,3-butadiene, and the like. Mixtures may also be used.

Vinyl aromatic hydrocarbons which may be utilized to prepare copolymers included styrene, o-methylstyrene, p-methylstyrene, p-tert-butylstyrene, 1,3-dimethylstyrene, alpha-methylstyrene, vinylnaphthalene, vinylanthracene and the like.

The block copolymers are typically hydrogenated prior to incorporation into the polyesters. The hydrogenation of these polymers and copolymers may be carried out by a variety of well established processes including hydrogenation in the presence of such catalysts as Raney Nickel, noble metals such as platinum, palladium and the like and soluble transition metal catalysts. The polymers and copolymers are hydrogenated in such a manner as to produce hydrogenated polymers and copolymers having a residual unsaturation content in the polydiene block of from about 0.5 to about 20 percent of their original unsaturation content prior to hydrogenation.

The block copolymers may also be grafted such as with maleic anhydride.

In addition to the above components, the polymer composition may include various other ingredients. As indicated above, in one embodiment, a polycarbonate polymer or a non-elastic copolyester polymer may be included in the composition for improved printability. When added to improve print acceptance, the above polymer may be present in an amount from about 5% to about 15% by weight, such as in an amount from about 8% to about 12% by weight.

Colorants that may be used include any desired inorganic pigments, such as titanium dioxide, ultramarine blue, cobalt blue, and other organic pigments and dyes, such as phthalocyanines, anthraquinones, and the like. Other colorants include carbon black or various other polymer-soluble dyes. The colorants can generally be present in the composition in an amount up to about 2 percent by weight.

Still another additive that may be present in the composition is an antioxidant, such as a sterically hindered phenol compound. Examples of such compounds, which are available commercially, are pentaerythrityl tetrakis[3-(3,5-di-tert-butyl-4-hydroxyphenyl)propionate] (Irganox 1010, BASF), triethylene glycol bis[3-(3-tert-butyl-4-hydroxy-5-methylphenyl)propionate] (Irganox 245, BASF), 3,3'-bis[3-(3,5-di-tert-butyl-4-hydroxyphenyl)propionohydrazide] (Irganox MD 1024, BASF), hexamethylene glycol bis[3-(3,5-di-tert-butyl-4-hydroxyphenyl)propionate] (Irganox 259, BASF), and 3,5-di-tert-butyl-4-hydroxytoluene (Lowinox BHT, Chemtura). In one embodiment, for instance, the antioxidant comprises tetrakis[methylene(3,5-di-tert-butyl-4-hydroxyhydrocinnamate)]methane. The antioxidant may be present in the composition in an amount less than 2% by weight, such as in an amount from about 0.1 to about 1.5% by weight Light stabilizers that may be present in the composition include sterically hindered amines. Such compounds include 2,2,6,6-tetramethyl-4-piperidyl compounds, e.g., bis(2,2,6,6-tetramethyl-4-piperidyl)sebacate (Tinuvin 770, BASF) or the polymer of dimethyl succinate and 1-(2-hydroxyethyl)-4-hydroxy-2,2,6,6-tetramethyl-4-piperidine (Tinuvin 622, BASF). UV stabilizers or absorbers that may be present in the composition include benzophenones or benzotriazoles.

Fillers that may be included in the composition include glass beads, wollastonite, loam, molybdenum disulfide or graphite, inorganic or organic fibers such as glass fibers, carbon fibers or aramid fibers. The glass fibers, for instance, may have a length of greater than about 3 mm, such as from 5 to about 50 mm.

Various other stabilizers may also be present in the composition. For instance, in one embodiment, the composition may contain a phosphite. For instance, in one embodiment, the phosphite compound may comprise distearyl pentaerythritol diphosphite.

Other additives that may be included in the composition include polymer additives that are present in an amount less than about 7% by weight, such as in an amount up to about 5% by weight. For example, in one embodiment, the composition may contain a thermoplastic ionomer. For instance, the composition may contain a random copolymer of poly(ethylene-co-methacrylic acid). In another embodiment, an ultrahigh molecular weight polyethylene or a fluoropolymer may be included in the composition. The polymer additives may be present in order to improve one or more properties related to rigidity and/or impact resistance.

In order to produce molded articles in accordance with the present disclosure, the different components of the polymer composition can be dry blended together in a drum tumbler or in a high intensity mixer. The premixed blends can then be melt blended and extruded as pellets. The pellets can then be used in an injection molding process.

The flexural modulus of the polymer composition may generally range from about 200 MPa to about 1000 MPa, such as from about 350 MPa to about 900 MPa. In one embodiment, the flexural modulus can be from about 400 MPa to about 450 MPa. In an alternative embodiment, the flexural modulus may be from about 650 MPa to about 850 MPa The present disclosure may be better understood with reference to the following examples.

EXAMPLE NO. 1

The following polymer compositions were formulated and tested for flexural modulus.

The following polymer compositions were formulated:

SAMPLE NO. 1

| Component | Weight Percentage |
|---|---|
| Polybutylene terephthalate (flexural modulus at 23° C. of 2200 MPa) | 76 |
| Polybutylene terephthalate (flexural modulus at 23° C. of 2500 MPa) | 3 |
| Methacrylate-butadiene-styrene impact modifier | 17.5 |
| Epoxy resin made with bisphenol-A | 0.5 |
| Benzotriazole stabilizer | 1.5 |
| Hindered amine light stabilizer | 1.5 |

SAMPLE NO. 2

| Component | Weight Percentage |
|---|---|
| Polyethylene terephthalate having an intrinsic viscosity of 0.85 | 40.05 |
| Polycarbonate | 39.650 |
| Organophosphite antioxidant | 0.3 |
| Methacrylate-butadiene-styrene impact modifier | 20 |

The above polymer compositions were molded into test specimens according to ISO standards. An extruder was used in which the temperature settings in the barrel varied from about 230° C. to about 260° C. The test specimens were injection molded and then tested for flexural modulus. The following results were obtained:

|  | Sample No. 1 | Sample No. 2 |
|---|---|---|
| Flexural modulus at 23° C. | about 1800 MPa | about 1600 MPa |
| Flexural modulus at −20° C. | 2084 MPa | 1879 MPa |
| Rigidity Factor | 1.16 | 1.17 |

As shown above, each of the above compositions displayed a rigidity factor of less than about 2, and particularly less than about 1.2.

EXAMPLE NO. 2

The following are polymer compositions formulated in accordance with the present disclosure.

| Components | Sample No. 3 (weight %) | Sample No. 4 (weight %) |
|---|---|---|
| Polybutylene terephthalate | 20 | 38 |
| Thermoplastic polyester elastomer | 33 | 32 |
| Methacrylate-butadiene-styrene impact modifier | 29 | 19.1 |
| Polycarbonate polymer | 10 | 10 |
| Antioxidant and color additive | 8 | 0.9 |

It is believed that the above compositions will have a flexural modulus of from about 200 MPa to about 1000 MPa and will exhibit a rigidity factor of less than 2, such as less than 1.5.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A boot comprising:
   a rigid outer shell having an exterior surface and an interior surface;
   a lining adjacent to the interior surface of the outer shell, the outer shell and lining defining an opening for receiving a foot of a wearer; and
   wherein the rigid outer shell is formed from a molded polymer composition, the polymer composition comprising a thermoplastic polymer, a thermoplastic elastomer, and an impact modifier, the polymer composition having a rigidity factor of about 2 or less, wherein the thermoplastic polymer comprises a first non-elastomeric polyester polymer and, wherein the polyester polymer is contained in the polymer composition in an amount from about 15% to about 50% by weight, the impact modifier being present in the polymer composition in an amount from about 15% to about 40% by weight, and the thermoplastic elastomer being present in the polymer composition in an amount from about 20% to about 40% by weight, and wherein the polymer composition further comprises a polycarbonate polymer, a non-elastic copolyester, or a second non-elastomeric polyester polymer and is present in the polymer composition in an amount from about 5% to about 15% by weight, the second non-elastomeric polyester polymer comprising a polybutylene terephthalate.

2. A boot as defined in claim 1, wherein the polymer composition has a rigidity factor of about 1.5 or less.

3. A boot as defined in claim 1, wherein the thermoplastic polymer comprises polybutylene terephthalate.

4. A boot as defined in claim 1, wherein the impact modifier has a core and shell construction, the core comprising the crosslinked diene-based elastomer, the shell comprising a thermoplastic polymer.

5. A boot as defined in claim 1, wherein the polymer composition has a rigidity factor of about 1.2 or less.

6. A boot as defined in claim 4, wherein the shell of the impact modifier comprises a methylmethacrylate polymer.

7. A boot as defined in claim 1, wherein the thermoplastic polymer has an intrinsic viscosity of from about 0.55 to about 1.20.

8. A boot as defined in claim 1, wherein the impact modifier has a particle size of from about 0.002 microns to about 50 microns.

9. A boot as defined in claim 1, wherein the thermoplastic elastomer comprises a thermoplastic polyester elastomer.

10. A boot as defined in claim 1, wherein the outer shell includes a boot portion and a separate cuff portion.

11. A boot as defined in claim 1, wherein the polymer composition has a flexural modulus of from about 350 MPa to about 500 MPa, the polyester polymer being present in the polymer composition in an amount from about 15% to about 35% by weight.

12. A boot as defined in claim 1, wherein the polymer composition has a flexural modulus of from about 600 MPa to about 900 MPa, the polyester polymer being present in the polymer composition in an amount from about 30% to about 50% by weight.

13. A boot as defined in claim 1, wherein the boot comprises a snow skiing boot, the outer shell including at least one flange for attachment to ski bindings.

14. A boot as defined in claim 4, wherein the core of the impact modifier comprises butadiene and styrene.

15. A boot as defined in claim 1, wherein neither the thermoplastic polymer, the thermoplastic elastomer, nor the impact modifier undergo a second order transition within a temperature range of from 50° C. to −40° C.

16. A molded polymer article well suited for use in low temperature environments comprising:

a molded product comprising outdoor sports equipment comprised of a polymer composition having a rigidity factor of about 2 or less, the polymer composition comprising a non-elastomeric polyester polymer, an impact modifier, and a thermoplastic elastomer, the polyester polymer comprising a polybutylene terephthalate polymer having a flexural modulus of from about 350 MPa to about 900 MPa, the polyester polymer being present in the polymer composition in an amount from about 15% to about 50% by weight, the impact modifier present in the polymer composition having a core and shell construction, the core comprising a crosslinked diene-based elastomer, the shell comprising a thermoplastic polymer, the impact modifier being present in the polymer composition in an amount from about 15% to about 40% by weight, the thermoplastic elastomer comprising a thermoplastic polyester elastomer, the thermoplastic elastomer being present in the polymer composition in an amount from about 20% to about 40% by weight.

17. A molded polymer article as defined in claim 16, wherein the polymer composition has a rigidity factor of about 1.5 or less.

18. A molded polymer article as defined in claim 16, wherein the molded polymer article comprises a snow ski boot and wherein the snow ski boot includes an outer shell comprised of the polymer composition.

19. A molded polymer article as defined in claim 16, wherein the polybutylene terephthalate polymer has an intrinsic viscosity of from about 0.55 to about 1.20.

20. A boot as defined in claim 1, wherein the polymer composition further comprises the polycarbonate polymer.

21. A boot as defined in claim 1, wherein the polymer composition further comprises the second non-elastomeric polyester polymer, the first non-elastomeric polyester polymer also comprising a polybutylene terephthalate polymer, the second non-elastomeric polyester polymer having a different flexural modulus in comparison to the first non-elastomeric polyester polymer.

22. A molded polymer article as defined in claim 16, wherein the polymer composition further contains a polycarbonate.

23. A molded polymer article as defined in claim 16, wherein the polymer composition includes a first non-elastomeric polyester polymer and a second non-elastomeric polyester polymer, the first non-elastomeric polyester polymer and the second non-elastomeric polyester polymer comprising polybutylene terephthalate, the first non-elastomeric polyester polymer having a different flexural modulus than the second non-elastomeric polyester polymer.

* * * * *